United States Patent
Nishiura et al.

(10) Patent No.: US 12,472,451 B2
(45) Date of Patent: Nov. 18, 2025

(54) COMPOSITE FIBER

(71) Applicant: Murata Manufacturing Co., Ltd., Nagaokakyo (JP)

(72) Inventors: Takako Nishiura, Nagaokakyo (JP); Takashi Tateishi, Nagaokakyo (JP); Masayuki Tsuji, Nagaokakyo (JP); Eiji Taguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 459 days.

(21) Appl. No.: 17/932,863

(22) Filed: Sep. 16, 2022

(65) Prior Publication Data
US 2023/0017656 A1    Jan. 19, 2023

Related U.S. Application Data

(63) Continuation of application No. PCT/JP2021/013033, filed on Mar. 26, 2021.

(30) Foreign Application Priority Data

Mar. 26, 2020 (JP) ................................ 2020-056313

(51) Int. Cl.
*B01D 39/20* (2006.01)
*B03C 3/45* (2006.01)
(Continued)

(52) U.S. Cl.
CPC ..... *B01D 39/2041* (2013.01); *B01D 39/2082* (2013.01); *B03C 3/45* (2013.01);
(Continued)

(58) Field of Classification Search
CPC ..... D01F 8/12; D01F 8/14; D01F 8/04; D01F 8/06; D01F 8/00; D01D 5/34;
(Continued)

(56) References Cited

U.S. PATENT DOCUMENTS 4,216,264 A * 8/1980 Naruse ...................... D01F 8/04
428/397
4,420,534 A * 12/1983 Matsui ...................... D01D 5/30
428/397

(Continued)

FOREIGN PATENT DOCUMENTS

CN       102836642 A    12/2012
EP        0369032 A1    5/1990
(Continued)

OTHER PUBLICATIONS

International Search Report in PCT/JP2021/013033, mailed Jun. 22, 2021, 4 pages.
(Continued)

*Primary Examiner* — Jennifer Dieterle
*Assistant Examiner* — Sonji Turner
(74) *Attorney, Agent, or Firm* — ArentFox Schiff LLP

(57) ABSTRACT

A composite fiber having a core sheath-structure that includes a core portion having an electrically conductive material, and a sheath portion having a ceramic component covering the core portion. The composite fiber is constructed such that, when the core portion is connected to a ground, the sheath portion exhibits one of a positive surface potential or a negative surface potential over an entire surface of the sheath portion.

18 Claims, 15 Drawing Sheets

(51) Int. Cl.
  *B03C 3/62* (2006.01)
  *D01F 8/18* (2006.01)
  *D01F 9/08* (2006.01)
(52) U.S. Cl.
  CPC .................. *B03C 3/62* (2013.01); *D01F 8/18* (2013.01); *D01F 9/08* (2013.01); *B01D 2239/0216* (2013.01); *B01D 2239/0241* (2013.01); *D10B 2101/08* (2013.01); *D10B 2101/20* (2013.01); *D10B 2401/16* (2013.01); *D10B 2505/04* (2013.01)
(58) Field of Classification Search
  CPC ............ B01D 39/2041; B01D 39/1623; B01D 39/163; D04H 1/5412
  See application file for complete search history.

(56) References Cited

U.S. PATENT DOCUMENTS

| | | | | |
|---|---|---|---|---|
| 4,627,950 | A * | 12/1986 | Matsui | D06M 11/77 264/210.8 |
| 4,743,505 | A * | 5/1988 | Yamada | D01F 8/00 428/394 |
| 6,420,026 | B1 * | 7/2002 | Okamoto | D01F 8/06 425/374 |
| 7,767,298 | B2 * | 8/2010 | Nakatsuka | A41D 31/26 428/374 |
| 9,078,205 | B2 | 7/2015 | Yuan et al. | |
| 9,102,570 | B2 * | 8/2015 | Joo | D01D 5/0038 |
| 2001/0008690 | A1 * | 7/2001 | Okamoto | B29C 48/06 428/374 |
| 2011/0151255 | A1 * | 6/2011 | Kim | C04B 35/6225 428/401 |
| 2011/0177395 | A1 * | 7/2011 | Kamisasa | D04H 3/016 442/364 |
| 2013/0008006 | A1 | 1/2013 | Israel et al. | |
| 2014/0332733 | A1 * | 11/2014 | Joo | D04H 1/728 423/608 |
| 2015/0352021 | A1 * | 12/2015 | Matsubayashi | A61K 8/24 442/417 |
| 2016/0032504 | A1 * | 2/2016 | Koori | D04H 1/724 442/364 |
| 2017/0173213 | A1 * | 6/2017 | Yates | C25D 9/04 |
| 2019/0003905 | A1 * | 1/2019 | Yoshida | H10N 30/857 |
| 2019/0175536 | A1 * | 6/2019 | Joo | B22F 1/0547 |
| 2020/0292206 | A1 * | 9/2020 | Tamakura | B01D 39/1623 |

FOREIGN PATENT DOCUMENTS

| | | | | |
|---|---|---|---|---|
| JP | 53130320 | A | * | 11/1978 |
| JP | S53130320 | A | | 11/1978 |
| JP | 106104952 | B2 | | 12/1994 |
| JP | 812425 | | * | 1/1996 |
| JP | H0812425 | A | | 1/1996 |
| JP | 11309314 | A | * | 11/1999 |
| JP | H11309314 | A | | 11/1999 |
| JP | 2000096344 | A | | 4/2000 |
| JP | 2003003367 | A | | 1/2003 |
| JP | 2007124276 | A | * | 5/2007 |
| JP | 6104952 | B2 | | 3/2017 |
| JP | 2018104878 | A | | 7/2018 |
| JP | 2018138280 | A | | 9/2018 |
| JP | WO-2019151330 | A1 | * | 8/2019 |
| WO | WO-2011053598 | A1 * | 5/2011 | ............... A61F 2/02 |
| WO | 2019151330 | A1 | | 8/2019 |
| WO | 2021193956 | A1 | | 9/2021 |

OTHER PUBLICATIONS

Wang Xu et al., "Study on Electret Meltblown Nonwoven for Filtration", Contamination Control & Air-Conditioning Technology (CC&AC), No. 3, 2006, pp. 45-47 and pp. 50.

* cited by examiner

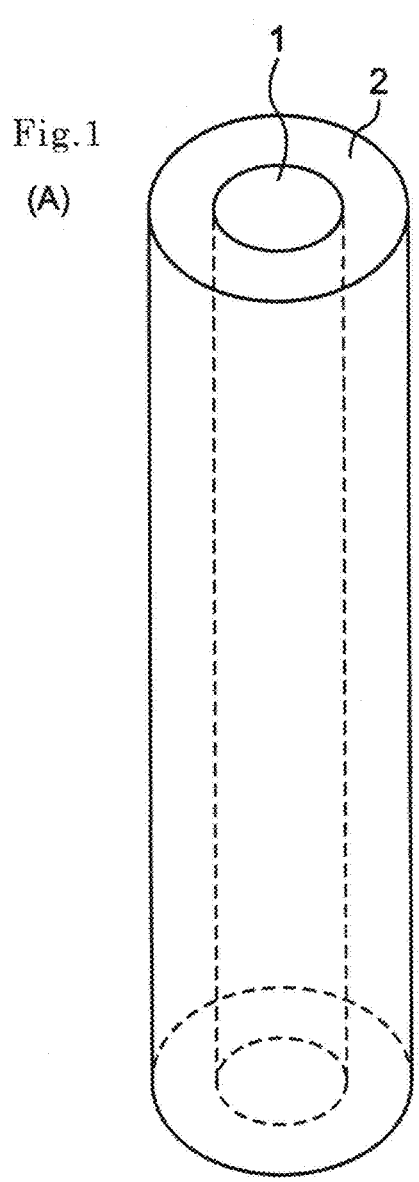
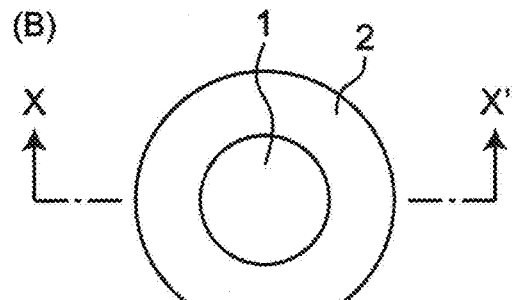
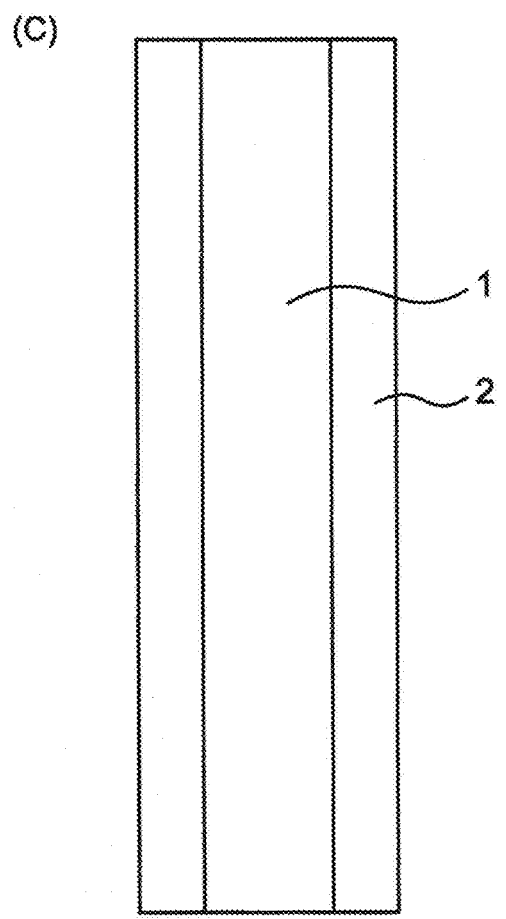

(A)

(B)

(A)

20

(B)

20

Fig.14 – PRIOR ART
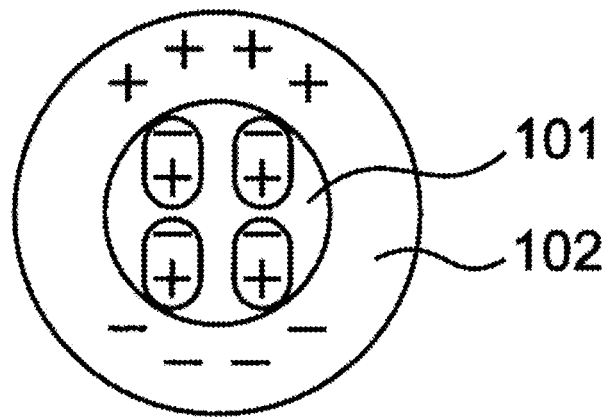
100

Fig.15 – PRIOR ART
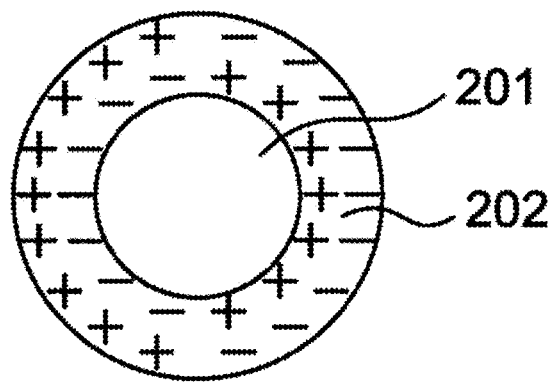

COMPOSITE FIBER

CROSS REFERENCE TO RELATED APPLICATIONS

The present application is a continuation of International application No. PCT/JP2021/013033, filed Mar. 26, 2021, which claims priority to Japanese Patent Application No. 2020-056313, filed Mar. 26, 2020, the entire contents of each of which are incorporated herein by reference.

BACKGROUND OF THE INVENTION

Field of the Invention

The present invention relates to a composite fiber. Specifically, the present invention relates to a composite fiber having a core sheath-structure, and more specifically to a composite fiber in which a core portion comprises a metal or an electrically conductive material and a sheath portion is a ceramic sheath portion comprising a ceramic component, or the like.

Description of the Related Art

For example, a resin fiber subjected to a charging treatment such as corona discharge, or the like is known as an electret fiber that can be used for a dust collecting filter (for example, JP-A-53-130320).

As the electret fiber, a core sheath type composite fiber produced using two different resin components, or the like is also known (for example, JP-B-6-104952 and JP-A-2018-138280).

Furthermore, a sheet using the electret fiber (electret fiber sheet) or the like is also known (for example, JP-A-2003-3367).

SUMMARY OF THE INVENTION

The present inventors have noticed that conventional electret fibers, particularly composite fibers made of resin, have problems to be overcome, and have found a need to take measures therefor. Specifically, the present inventors have found the following problems.

According to studies conducted by the present inventors, it has been found that when a resin fiber is electretized (subjected to a charge treatment) by a method such as corona discharge (for example, JP-A-53-130320), charges easily disappear over time. It has been also found that charges easily disappear from the surface of the fiber only by washing with water or isopropyl alcohol (IPA) or the like. Therefore, according to the studies conducted by the present inventors, it has been found that the method such as corona discharge makes it difficult to densely charge the surface of the fiber.

A fiber obtained by electretizing a core sheath type resin fiber (composite fiber) produced using two different resin components, or the like is also known (for example, JP-B-6-104952 and JP-A-2018-138280). According to the studies conducted by the present inventors, it has been found that positive and negative charges are mixed on the surface of such an electret fiber, whereby charges are easily neutralized, and disappear, which makes it difficult to densely charge the fiber. This has been found to also make it difficult to express only a positive or negative charge on the surface of the fiber.

For example, as shown in FIG. 14, in a resin composite fiber (100) described in JP-B-6-104952, a core portion (101) is made of a polar polymer, and a sheath portion (102) is made of a nonpolar polymer. Therefore, when such a composite fiber is electretized, both of positive and negative charges exist (are mixed) on the surface (fiber surface) of the sheath portion (102), and are positively and negatively polarized inside the core portion (101).

For example, as shown in FIG. 15, in a resin composite fiber (200) described in JP-A-2018-138280, a core portion (201) is made of a nonpolar polymer, and a sheath portion (202) is made of a polar polymer. Therefore, when such a composite fiber is electretized, both of positive and negative charges are mixed in the sheath portion (202).

Furthermore, JP-A-2003-3367 discloses an electret fiber sheet that can be used for an air filter or the like. However, the surface of such an electret fiber sheet, particularly the surface of an electret fiber is positively and negatively charged so that positive and negative charges are mixed.

Therefore, in the conventional resin fiber, both of the positive and negative charges are mixed on the surface of the fiber, whereby the charges disappear over time due to the neutralization of the charges, which makes it difficult to densely charge the resin fiber. It is also difficult to express only a positive or negative surface potential on the surface of the fiber.

The present invention has been made in view of such problems. That is, a main object of the present invention is to provide a composite fiber that can be densely charged on the surface of the fiber, or can have only a positive or negative surface potential (charge) on the surface of the fiber.

The present inventors have attempted to solve the above problems by addressing the problems in a new direction without particularly using a resin fiber, instead of coping with the problems in the extension of the conventional techniques. As a result, the present inventors have achieved the invention relating to a composite fiber achieving the main object.

The present invention provides a composite fiber having a core sheath-structure that includes a core portion comprising a metal or an electrically conductive material, and a sheath portion comprising a ceramic component covering the core portion.

The present invention can provide a composite fiber that can be densely charged on the surface of the fiber, or can have only a positive or negative surface potential (charge) on the surface of the fiber. Note that effects described in the present specification are merely examples and are not limited, and additional effects may be provided.

BRIEF DESCRIPTION OF THE DRAWINGS

FIGS. 1(A) to 1(C) are schematic views showing a composite fiber according to an embodiment of the present invention;

FIG. 14 is a schematic cross-sectional view schematically showing the charged state of a conventional composite fiber (electret fiber); and FIG. 15 is a schematic cross-sectional view schematically showing the charged state of another conventional composite fiber (electret fiber).

DETAILED DESCRIPTION OF PREFERRED EMBODIMENTS OF THE INVENTION

Figure 2:
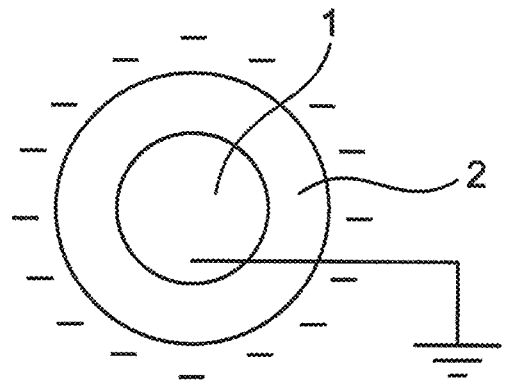
FIGS. 2(A) and 2(B) are schematic views showing the charged state (surface potential) of a composite fiber according to an embodiment of the present invention.
Figure 2:
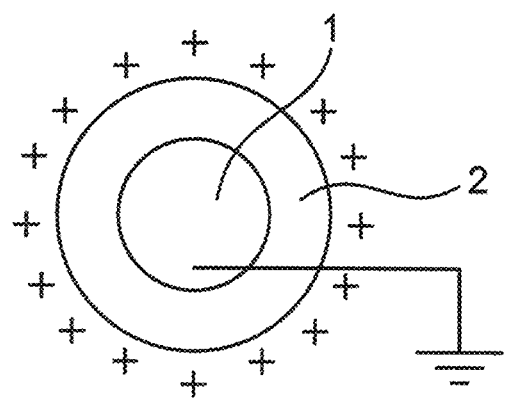

The present invention relates to a composite fiber. The present invention specifically relates to a composite fiber that can be electretized or is electretized (electret fiber). More specifically, the present invention relates to a composite fiber having a "core sheath-structure" comprising a "core portion" and a "sheath portion" covering the core portion, wherein the core portion comprises a "metal" or an "electrically conductive material", and the sheath portion is a "ceramic sheath portion" comprising a "ceramic component" (hereinafter, sometimes referred to as a "composite fiber of the present disclosure", simply a "composite fiber" or a "fiber").

The composite fiber of the present disclosure has a technical idea completely different from that of a conventional electret fiber (resin fiber). For example, in the composite fiber of the present disclosure, the core portion comprises the "metal" or the "electrically conductive material", whereby such a core portion can have at least electrical conductivity. When the core portion is connected to the ground (or GND-connected) after electretization, the sheath portion can exhibit only a positive or negative surface potential over the entire surface area of the "ceramic sheath portion" covering the core portion. In the composite fiber of the present disclosure, the sheath portion exhibits only a positive or negative surface potential, whereby the surface of the fiber (the surface of the sheath portion) can be densely charged. As a result, the value of the positive or negative surface potential can be improved.

(Composite Fiber)

In the present disclosure, the "composite fiber" generally means a fiber that can be composed of two or more different materials. In the composite fiber of the present disclosure, it is meant that the "core portion" and the "sheath portion" of the "core sheath-structure" described in detail below are each composed of different materials (or main components).

In the present disclosure, the "core sheath-structure" means a structure having at least a "core portion" and a "sheath portion" covering the core portion. In the present disclosure, the sheath portion may cover at least a part of the core portion. In the present disclosure, the sheath portion may cover the entire core portion.

In the present disclosure, the "core portion" is a portion including the geometrical center of a cross-sectional shape in a cross section perpendicular to the axial direction of the fiber. For example, as shown in FIGS. 1(A) to 1(C), a core portion 1 is a portion including the center of a circular cross section in a direction perpendicular to the axial direction of a composite fiber 10 (see FIG. 1(B)). In the composite fiber of the present disclosure, the shape of the core portion is not limited to the illustrated form.

In the composite fiber of the present disclosure, the "core portion" comprises a "metal" or an "electrically conductive material", but may contain other components as necessary.

In the present disclosure, the "metal" means a metal (preferably a simple metal) or an alloy that may be composed of the following metal elements. In the composite fiber of the present disclosure, the core portion may be composed of a metal wire.

The metal or the alloy that can constitute the core portion in the composite fiber of the present disclosure may be a sintered body. A simple metal composed of a sintered body may be used for the core portion.

In the present disclosure, the "sintered body" generally means a sintered body (inorganic solid material) obtained by subjecting an inorganic substance (preferably, a paste of a composition containing an inorganic substance) to a heat treatment to harden the inorganic substance.

Examples of the "metal element" include at least one selected from the group consisting of gold (Au), silver (Ag), copper (Cu), iron (Fe), aluminum (Al), nickel (Ni), palladium (Pd), and platinum (Pt).

In the present disclosure, the "electrically conductive material" means a material having electrical conductivity, and is not particularly limited as long as it has electrical conductivity.

The "electrically conductive material" is preferably, for example, a composite of an "electrically conductive filler" and a "resin" described below.

The "electrically conductive filler" that may be contained in the "electrically conductive material" means a material (substance) that can impart electrical conductivity to (make electricity/electrons easily pass through) a polymer material such as a resin, and is not particularly limited as long as it can impart conductivity. Examples of the electrically conductive filler include carbon-based, metal-based, and metal-oxide-based electrically conductive fillers. As the electrically conductive filler, for example, carbon black, acetylene black, Ketjen black, a nanocarbon material, gold, silver, platinum, nickel, copper, zinc, aluminum, tin, manganese, stainless steel, tin oxide, indium oxide, zinc oxide, zinc nickel oxide, magnesium, tungsten, cobalt, chromium, and titanium and the like can be used.

The "resin" that may be contained in the "electrically conductive material" means, for example, a polymer material, and is not particularly limited as long as it is a polymer material. A resin such as a thermoplastic resin or a thermosetting resin may be appropriately used as necessary. The resin is preferably a resin having a volume resistivity of $10^{14}$ [Ω·m] or less. For example, a phenol resin, an epoxy resin, a bismaleimide resin, a vinyl chloride-based resin, a urethane resin, a nylon resin, an ether resin, a polyether resin, a ketone resin, a wholly aromatic polyester resin, a polyamide resin, a polyester resin, an acrylic resin, a polymethyl methacrylate resin, a melamine resin, and a silicon resin and the like can be used.

The term "composite" used for the "electrically conductive material" means two or more materials, specifically, a material (composite material) in which an "electrically conductive filler" and a "resin" are composited. In the present disclosure, the composite may be a mixture (or formulation) obtained by simply mixing (or blending) two or more materials.

The ratio of the electrically conductive filler to the resin (electrically conductive filler/resin) in the composite is, for example, 99/1 to 1/99, and preferably 80/20 to 40/60 on a weight basis.

In the composite fiber of the present disclosure, the core portion comprises the metal and the electrically conductive filler and the like, and thus can be electrically connected to the outside. Preferably, the core portion is connected to the ground or GND-connected after the composite fiber of the present disclosure is charged (electretized), so that only a positive or negative surface potential can be exhibited in the "sheath portion" described in detail below (preferably over the entire surface of the sheath portion).

In the present disclosure, the "sheath portion" means a portion that covers the "core portion", and may be any portion that can cover at least a part of the core portion. The sheath portion may cover the entire core portion.

For example, as shown in FIGS. 1(A) to 1(C), a sheath portion 2 may be a portion concentrically covering a core portion 1 of a composite fiber 10 (see FIG. 1(B)). In the composite fiber of the present disclosure, the shape of the sheath portion is not limited to the illustrated form.

In the present disclosure, the "sheath portion" is preferably a "ceramic sheath portion". In the present disclosure, the "ceramic sheath portion" means a sheath portion comprising a "ceramic component" described below. The "ceramic sheath portion" may contain other components as necessary.

In the present disclosure, the "ceramic component" means a sintered body (inorganic solid material) obtained by subjecting an inorganic substance such as a ceramic or a ceramic raw material (preferably, a paste of a composition containing an inorganic substance) to a heat treatment to harden the inorganic substance.

The "ceramic component" is not particularly limited, and examples thereof include ceramics such as alumina (aluminum oxide), zirconia (zirconium oxide), tricalcium phosphate, and apatite. Among them, those used as a ceramic-based biomaterial are preferably used. In particular, it is preferable to use an apatite having biocompatibility as a biomaterial and having high mechanical strength, high fracture toughness, and excellent electronic properties and the like. In such a case, the apatite is the ceramic known as the biomaterial, but has specificity in that it is used in the field of fibers such as electret fibers.

The "apatite" is a ceramic known as a calcium phosphate-based functional inorganic material, and contains phosphorus (P) and calcium (Ca) as main components. The apatite generally has high mechanical strength and fracture toughness, and is excellent in electronic properties, biocompatibility, ion exchangeability, surface adsorption properties, and optical properties and the like.

In the composite fiber of the present disclosure, such a material is used for the sheath portion of the core sheath-structure, so that high mechanical strength and fracture toughness can be imparted to the sheath portion, and electronic properties such as expression and control of charge retention ability can be imparted to the fiber.

The "apatite" is preferably at least one selected from the group consisting of a fluoroapatite, a chloroapatite, and a hydroxyapatite. Among them, the hydroxyapatite is particularly preferably used. The hydroxyapatite is the ceramic known as the biomaterial, but has specificity in that it is used in the field of fibers such as electret fibers. The hydroxyapatite can provide not only high mechanical strength and fracture toughness but also excellent electronic properties such as charge retention ability.

The "fluorapatite" (FAp) is represented by the chemical formula: $Ca_5(PO_4)_3F$, and is also called "fluoroapatite" or "fluorophosphite".

The "chlorapatite" (CAp) (chloroapatite) is represented by the chemical formula: $Ca_5(PO_4)_3Cl$, and is also called "chlorapatite" or "chlorophosphite".

The "hydroxyapatite" (HAp) is represented by the chemical formula: $Ca_5(PO_4)_3OH$, and is also referred to as "hydroxyapatite" or "hydroxyphosphite".

The "ceramic sheath portion" is preferably composed of an apatite simple substance (a simple substance of the apatite, preferably a hydroxyapatite simple substance), or a composite of an apatite (the apatite, preferably a hydroxyapatite) and a resin. The ceramic sheath portion is more preferably composed of a composite of an apatite and a resin. Alternatively, the ceramic sheath portion may be composed of a sintered body.

The "resin" that may be contained in the "ceramic sheath portion" means, for example, a polymer material, and is not particularly limited as long as it is a polymer material. A resin such as a thermoplastic resin or a thermosetting resin may be appropriately used as necessary. As the resin, for example, a phenol resin, an epoxy resin, a bismaleimide resin, a polypropylene resin, a polyimide resin, a polyamideimide resin, and an acrylonitrile resin or the like can be used. One or more hindered amine-based additives or triazine-based additives may be blended in the resin material.

The term "composite" used for the "ceramic sheath portion" means two or more materials, specifically, a material (composite material) in which an "apatite" and a "resin" are composited. In the present disclosure, the composite may be a mixture (or formulation) obtained by simply mixing (or blending) two or more materials.

The ratio of the apatite to the resin (apatite/resin) in the composite is, for example, in the range of 99/1 to 1/99, preferably 64/36 to 1/99, more preferably 30/70 to 1/99, and still more preferably 20/80 to 1/99 on a volume basis.

In the composite fiber of the present disclosure, the sheath portion comprises the ceramic component (in particular, apatite), so that the core portion is connected to the ground or GND-connected after the composite fiber of the present disclosure is charged (electretized), whereby only a positive or negative surface potential can be exhibited over the entire surface of the sheath portion. Therefore, the surface of the sheath portion is positively or negatively charged, so that positive and negative charges are not neutralized to disappear on the surface of the fiber, and the surface of the fiber can be densely charged, whereby the electrical characteristics of the fiber are improved. The composite fiber of the present disclosure makes it also possible to select the polarity of the surface potential and control the magnitude of the surface potential.

In the present disclosure, the "surface potential" means a potential that can be generated on the surface of the composite fiber, particularly on the surface of the sheath portion. The surface potential can be measured by, for example, an electric force microscope (EFM). The surface potential of the composite fiber of the present disclosure is preferably measured by, for example, an electric force microscope (EFM) after the core portion is connected to the ground (in other words, after GND-connected).

The surface potential that can be generated on the surface (preferably the surface of the sheath portion) of the composite fiber of the present disclosure is, for example, 1 mV or more, preferably 20 V or more, more preferably 50 V or more, still more preferably 70 V or more, and particularly preferably 100 V or more. The upper limit value of the surface potential is, for example, 2000 V or less, preferably 1000 V or less, more preferably 500 V or less, still more preferably 450 V or less, and particularly preferably 350 V or less or 300 V or less. In the composite fiber of the present disclosure, the surface potential may be a positive value or a negative value.

In the composite fiber of the present disclosure, the volume ratio of the core portion to the sheath portion (core portion/sheath portion) is not particularly limited, and is, for example, in the range of 1/99 to 99/1.

In the composite fiber of the present disclosure, the weight ratio of the core portion to the sheath portion (core portion/sheath portion) is not particularly limited, and is, for example, in the range of 1/99 to 99/1.

The fiber diameter of the composite fiber of the present disclosure is, for example, 10 μm to 200 μm. Here, the "fiber diameter" of the composite fiber of the present disclosure means the largest dimension (for example, diameter) in a cross section in a direction perpendicular to the axial direction of the fiber.

The composite fiber of the present disclosure is preferably an "electret fiber". In the present disclosure, the "electret fiber" means both of a fiber that can be electretized and a fiber that has been electretized.

In the present disclosure, the "electretization" means charging with electricity (charging), and specifically means performing charging processing or the like. The charging processing is not particularly limited, and a conventionally publicly-known charging method can be appropriately used. For example, electric field processing, preferably electric field applying or the like can be used.

EMBODIMENT OF THE PRESENT INVENTION

A composite fiber according to an embodiment of the present invention is shown in FIGS. 1(A) to 1(C). The present invention is not limited to the illustrated embodiment.

FIG. 1(A) is a schematic perspective view schematically showing a composite fiber 10 according to an embodiment of the present invention. The composite fiber 10 has a core sheath-structure that can be composed of a core portion 1 and a sheath portion 2.

FIG. 1(B) shows the cross section of the composite fiber 10 in a direction perpendicular to an axial direction. In the illustrated embodiment, both of the core portion 1 and the sheath portion 2 have a substantially circular cross section, and are disposed in a substantially concentric manner. In the composite fiber of the present disclosure, the shapes of the cross sections of the core portion 1 and the sheath portion 2 are not particularly limited. The core portion 1 and the sheath portion 2 may have any geometric shape, for example, a cross-sectional shape such as a circular shape, an elliptical shape, a rectangular shape, or an irregular shape.

FIG. 1(C) shows the cross section (the cross section in the axial direction of the composite fiber 10) taken along line X-X' in FIG. 1(B).

As described above, in the illustrated embodiment, the sheath portion 2 entirely covers the core portion 1 in both of its axial direction and circumferential direction. In the composite fiber of the present disclosure, the sheath portion may cover at least a part of the core portion.

The thickness of the sheath portion 2 is not particularly limited, and may be the same as the diameter of the core portion 1, may be smaller than the diameter of the core portion 1, or may be larger than the diameter of the core portion 1. The ratio of the diameter of the core portion 1/the thickness of the sheath portion 2 is, for example, in the range of 99/1 to 1/99, preferably 99/1 to 50/50 or 50/50 to 1/99, and more preferably 99/1 to 51/49 or 49/51 to 1/99. The thickness of the sheath portion 2 is, for example, 10 mm or less, preferably 5 mm or less, and more preferably 1 mm or less.

FIGS. 2(A) and 2(B) are schematic views showing a state where the composite fiber 10 according to an embodiment of the present invention is charged.

FIG. 2(A) shows a state where the sheath portion 2 (the surface of the fiber) of the electretized composite fiber 10 is negatively (−) charged. At this time, the core portion 1 is connected to the ground or GND-connected, and the sheath portion 2 can exhibit only a negative (−) surface potential over the entire surface of the sheath portion 2 (in both of the axial direction and the circumferential direction). Such a charged state can be achieved, for example, by applying an electric field so that the sheath portion 2 is negatively (−) charged in the composite fiber of the present disclosure at the time of electretization.

FIG. 2(B) shows a state where the sheath portion 2 (the surface of the fiber) of the electretized composite fiber 10 is positively (+) charged. At this time, the core portion 1 is connected to the ground or GND-connected, and the sheath portion 2 can exhibit only a positive (+) surface potential over the entire surface of the sheath portion 2 (in both of the axial direction and the circumferential direction). Such a charged state can be achieved, for example, by applying an electric field such that the sheath portion 2 is positively (+) charged in the composite fiber of the present disclosure at the time of electretization.

As described above, in the present invention, when the core portion is connected to the ground or GND-connected to measure the surface potential of the sheath portion, the surface potential of one-side polarity can be exhibited in any portion in the plane (sheath portion).

That is, as described above, in the composite fiber of the present disclosure, the surface potential exhibits one-side polarity even when any portion of the surface of the fiber (sheath surface) is measured, and thus it can be said that the surface charge is unevenly distributed to the one-side polarity or the one-side polarity is dominant.

Thus, in the composite fiber of the present disclosure, an electrostatic force is not canceled on the surface of the fiber, and the electrical characteristics of the electret are improved.

According to the present invention, the polarity and magnitude and the like of the surface potential can be controlled, whereby a desired fiber (in particular, electret fiber) can be designed.

Figure 3:
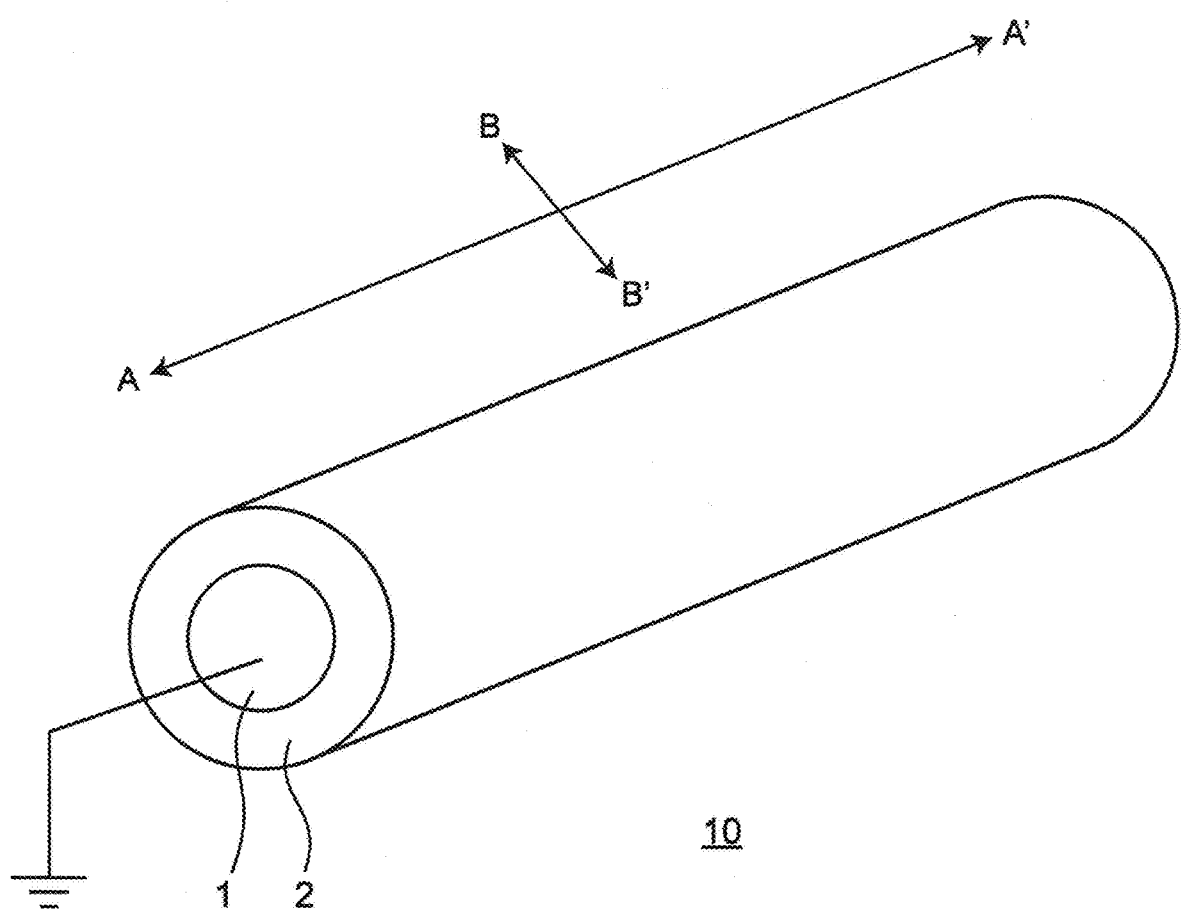
FIG. 3 is a schematic view schematically showing a method for measuring a surface potential in a composite fiber according to an embodiment of the present invention.

FIG. 3 is a schematic view schematically showing an example of a method for measuring the surface potential of the composite fiber 10. The surface potential of the composite fiber 10 can be measured by a method including at least the following steps (a), (b), and (c).

(a) step of fixing the electretized composite fiber 10
(b) step of connecting the core portion 1 of the composite fiber 10 to the ground or GND-connecting
(c) step of measuring the surface potential of the composite fiber 10 by an electric force microscope (EFM)

Step (a)

In the step (a), the electretized composite fiber 10 is fixed. For example, the composite fiber 10 can be fixed by sandwiching both of the ends of the composite fiber 10 between rigid jigs. At this time, tension may be applied to the composite fiber 10.

Step (b)

In the step (b), the core portion 1 of the composite fiber 10 is connected to the ground or GND-connected. Note that this step may be performed before the step (a).

Step (c)

In the step (c), the surface potential of the composite fiber 10 (the surface potential of the sheath portion 2) is measured by the electric force microscope (EFM). For example, a probe of the electric force microscope scans both of the axial direction (A-A' direction) and circumferential direction (B-B' direction) of the composite fiber 10, whereby the surface potential of the sheath portion 2 can be measured over the entire surface.

Alternatively, the surface potential of the composite fiber may be measured using an electrometer (for example, S2002A manufactured by Kawaguchi Electric Works, Ltd.). At this time, a potential measured at an interval of 3 mm from the surface of the fiber is taken as the surface potential of the composite fiber.

(Method for Producing Composite Fiber of The Present Disclosure)

The composite fiber of the present disclosure comprises at least a "core portion" and a "sheath portion", and the "core portion" and the "sheath portion" are preferably integrally formed or produced adjacent to each other.

A method for producing the composite fiber of the present disclosure is not particularly limited, and for example, the composite fiber of the present disclosure can be appropriately produced by applying a conventionally publicly-known ceramic calcination technique or the like.

For example, a composite fiber in which the core portion and the sheath portion are integrally formed adjacent to each other can be produced by preparing a paste (paste for core portion) obtained from a raw material containing the metal element together with a sintering aid or a co-material, a binder (resin) (for example, ethyl cellulose, cellulose acetate butyrate, polyvinyl butyral), a dispersant (for example, a polycarboxylic acid-based dispersant), a plasticizer, a solvent (for example, butyl carbitol, toluene) and the like as necessary and a paste (paste for sheath portion) obtained from a raw material of the ceramic component (a ceramic or a ceramic raw material) together with a sintering aid or a co-material, a binder (resin) (for example, ethyl cellulose, cellulose acetate butyrate, polyvinyl butyral), a dispersant (for example, a polycarboxylic acid dispersant), a plasticizer, a solvent (for example, butyl carbitol, toluene) and the like as necessary, followed by, for example, appropriately molding, and for example, calcining them together. At this time, each paste may be molded into a desired shape using, for example, a multiple nozzle (a composite spinning nozzle such as a double nozzle or a triple nozzle), and a molding die and the like.

Both of the core portion and the sheath portion of the composite fiber of the present disclosure may comprise a sintered body. In other words, both of the core portion and the sheath portion may be composed of a sintered body. Preferably, both of the core portion and the sheath portion are sintered bodies. When both of the core portion and the sheath portion of the composite fiber comprise a sintered body, the surface of the composite fiber, particularly the surface of the sheath portion can be more densely charged. As a result, a potential of 100 V or more, preferably 300 V or more can be achieved.

When a composite is used for the core portion or the sheath portion (for example, a case where a composite of an electrically conductive filler and a resin is used for the core portion, and a case where a composite of an apatite and a resin is used for the sheath portion, and the like), the composite fiber of the present disclosure may be produced by preparing a paste of each composite and then molding each paste into a desired shape using, for example, a multiple nozzle (a composite spinning nozzle such as a double nozzle or a triple nozzle) or a molding die or the like.

When the core portion is made of a metal, a metal wire or a metal plate having a desired shape may be used.

The method for producing a composite fiber of the present disclosure is not limited to the above method.

(Application)

The composite fiber of the present disclosure may be used as a yarn. The yarn may be, for example, a yarn obtained by simply aligning a plurality of fibers (aligned yarn) or a yarn obtained by twisting (twisted yarn). The twisting method is not particularly limited, and conventionally publicly-known methods can be used. The composite fiber of the present disclosure may be electretized in such a state of yarn.

The composite fiber of the present disclosure can also be provided as a filter or a cloth containing such a yarn (for example, woven fabric, knitted fabric, and nonwoven fabric). The composite fiber of the present disclosure is preferably used as an electret filter. The composite fiber can be used as electret filters for dust collection, pollen measures, antibacterial, and antivirus, and the like.

The composite fiber of the present disclosure is not limited to the above embodiment. Hereinafter, the composite fiber of the present disclosure will be described in more detail with reference to Examples.

EXAMPLES

Example 1

In Example 1, a composite fiber having a shape shown in FIGS. 1(A) to 1(C) was prepared using the following "metal wire for core portion" and "paste for sheath portion".

<Metal Wire for Core Portion>

A copper wire (Cu) was prepared as a metal wire for core portion (diameter: 0.1 mm).

<Paste for Sheath Portion>

An apatite/polyamideimide-based material (resin) (volume ratio: 20/80) was wet-mixed to prepare a paste for sheath portion.

According to an extrusion molding method using a nozzle, a paste for sheath portion was coated around a copper wire (metal wire for core portion) to prepare a composite fiber molded body having a core sheath-structure. Then, the molded body was heated at a temperature of 250° C. to 300° C. to produce a composite fiber made of a composite comprising a core portion made of copper (Cu) and a sheath portion containing a hydroxyapatite (HAp) (diameter of core portion: 0.1 mm, thickness of sheath portion: 0.1 mm).

An electric field was applied to the composite fiber prepared in Example 1 to negatively (−) charge the sheath portion. The core portion was then connected to the ground, and a surface potential was measured by an electric force microscope (EFM). As a result, it was found that the entire surface of the sheath portion was only negatively (−) charged (FIG. 2(A)).

Similarly, an electric field was applied to the composite fiber prepared in Example 1 to positively (+) charge the sheath portion. The core portion was then connected to the ground, and a surface potential was measured by an electric force microscope (EFM). As a result, it was found that the entire surface of the sheath portion was only positively (+) charged (FIG. 2(B)).

Example 2

In Example 2, a surface potential measurement sample imitating an electret filter composed of the composite fiber of the present disclosure was prepared, and the surface potential of the sample was measured.

<Preparation of Measurement Sample>

Figure 4:
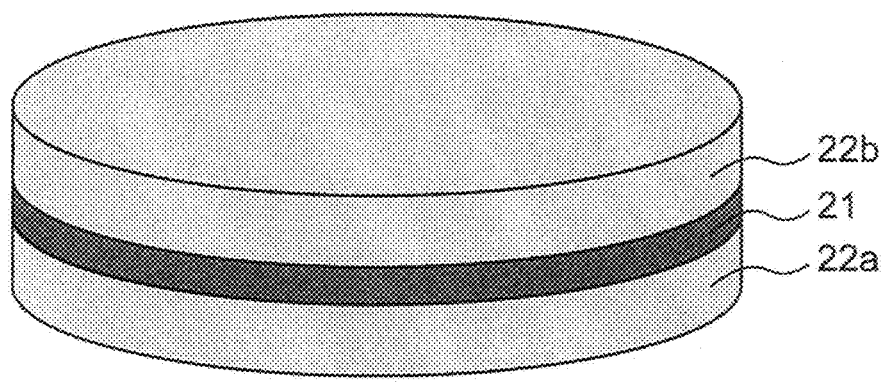
FIGS. 4(A) and 4(B) are schematic views showing a measurement sample of a surface potential used for Examples of the present invention.
Figure 4:
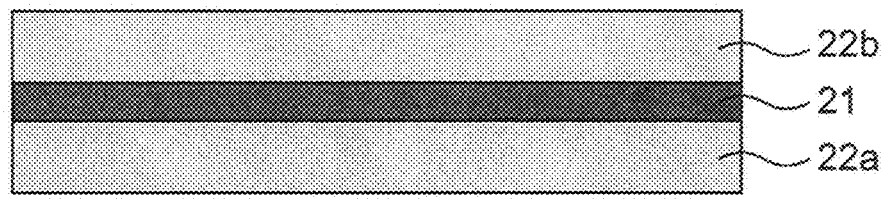

As shown in FIGS. 4(A) and 4(B), a surface potential measurement sample 20 (disc shape, diameter: 8 mm) was prepared. In the sample 20, a ceramic layer 22 (22a, 22b), which can correspond to a sheath portion, was disposed on each surface of a metal layer (or an electrically conductive layer) 21, which can correspond to a core portion of the composite fiber of the present disclosure.

FIG. 4(A) is a schematic perspective view of the measurement sample 20, and FIG. 4(B) is a schematic cross-sectional view of the measurement sample 20 (showing the cross section of a diameter portion in a lamination direction).

In the present Example, the metal layer 21 is composed of copper (Cu) (thickness: 0.1 mm), and the ceramic layers 22a and 22b are each composed of a hydroxyapatite (HAp) (thickness: 1 mm). The ceramic layers 22a and 22b were prepared from the paste for sheath portion used for Example 1.

<Electretization>

Figure 5:
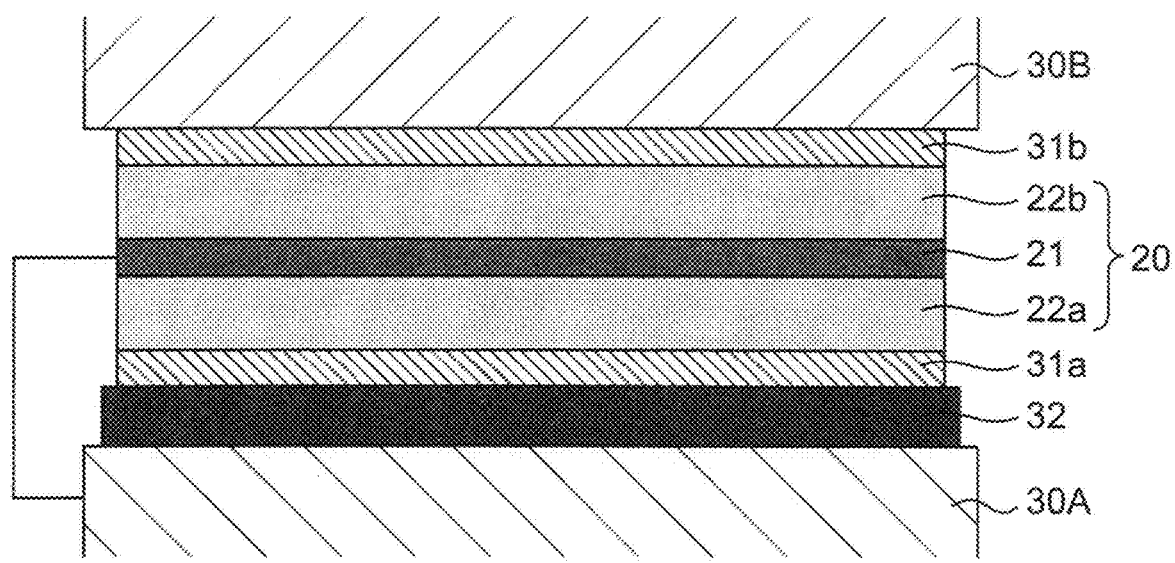
FIG. 5 is a schematic view schematically showing a charging method of a measurement sample of a surface potential used for Examples of the present invention.

For example, as shown in FIG. 5, the measurement sample 20 was disposed between two electrodes (30A (negative electrode (−) of aluminum (Al)), 30B (positive electrode (+) of aluminum (Al))). At this time, a copper foil (copper tape) as a sub-electrode layer 31a and a silicone rubber film as an insulating layer 32 were disposed between the ceramic layer (HAp) 22a and a negative electrode (Al) 30A. A copper foil (copper tape) was disposed as a sub-electrode layer 31b between the ceramic layer (HAp) 22b and a positive electrode (Al) 30B. The metal layer (Cu) 21 of the measurement sample 20 was electrically connected to the negative electrode (Al) 30A.

An electric field was applied to the measurement sample 20 under the following electric field application conditions to perform electretization.

Electric Field Application Conditions
 Temperature: 200° C.
 Voltage: 1000 V
 Electric field strength: 10 kV/cm
 Application time: 1 hour In the present Example, both of the ceramic layers 22a and 22b were positively (+) charged as described above (hereinafter, referred to as "sample A"). Furthermore, using yet another identical measurement sample, both of the ceramic layers 22a and 22b were negatively (−) charged (hereinafter, referred to as "sample B") by applying an electric field (30A: positive electrode (+), 30B: negative electrode (−)) with the polarities of the electrodes (30A, 30B) being reversed.

<Measurement of Surface Potential>

For the "sample A" and the "sample B", the metal layer 21 was connected to the ground, and then the surface potentials of the samples were measured.

Figure 6:
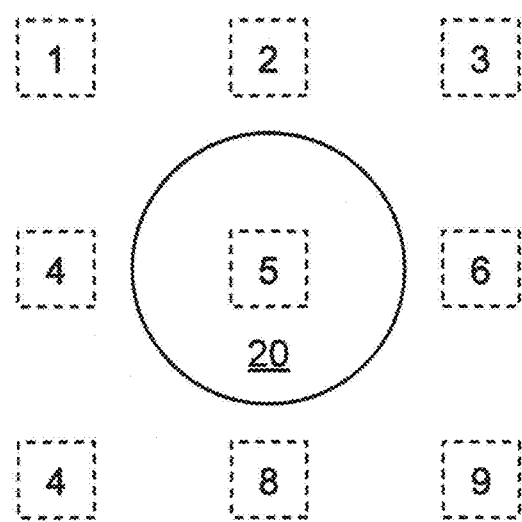
FIG. 6 is a schematic view (top view) schematically showing measurement points (nine places) of a measurement sample of a surface potential used for Examples of the present invention.

Specifically, a potential was measured using an electrometer (manufactured by Kawaguchi Electric Works, Ltd., S2002A) at each of nine measurement points 1 to 9 shown in FIG. 6 (top view) at an interval of 3 mm from the upper surface of the measurement sample 20. A surface potential was similarly measured at each of the measurement points 1 to 9 at an interval of 3 mm from the lower surface of the measurement sample 20.

The intervals between the measurement points were equal and 3 mm.

Figure 7:
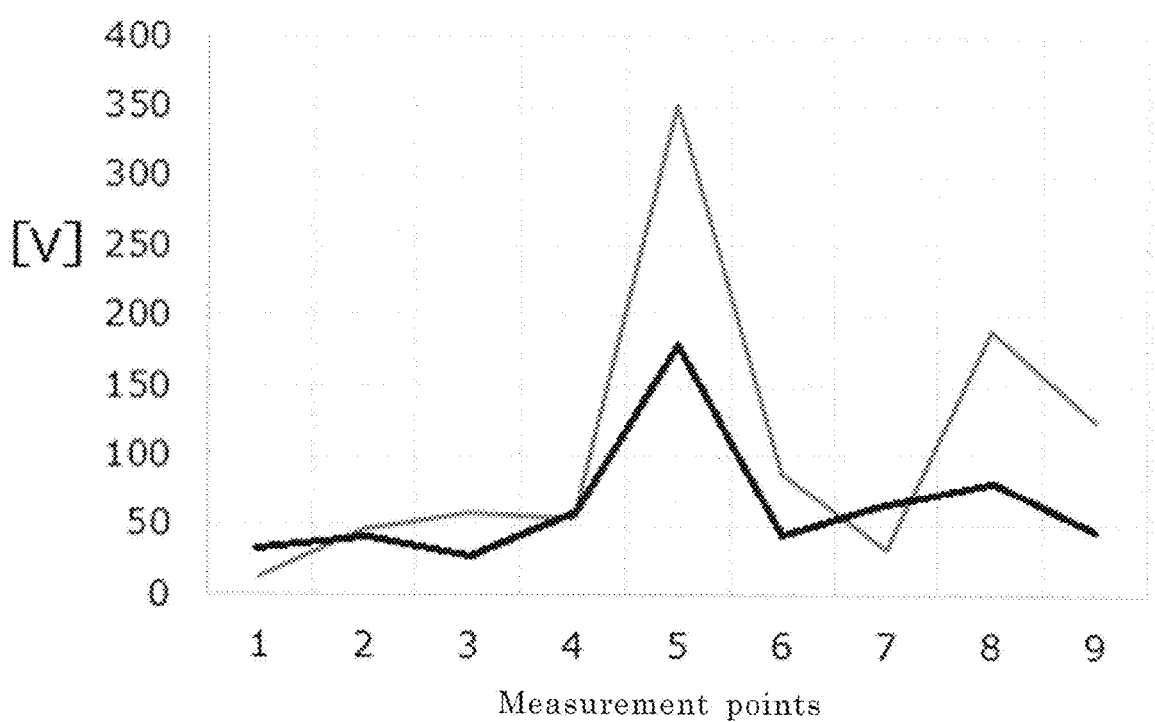
FIG. 7 is a graph showing a potential at each measurement point of a measurement sample (positively charged sample) of a surface potential used for Examples of the present invention.

The results of measurement using the "sample A" (ceramic layer (+)) are shown in FIG. 7.

In the "sample A", only a positive (+) potential was exhibited at the measurement points 1 to 9 on both of the upper and lower surfaces (upper surface: thin line, lower surface: thick line).

Figure 8:
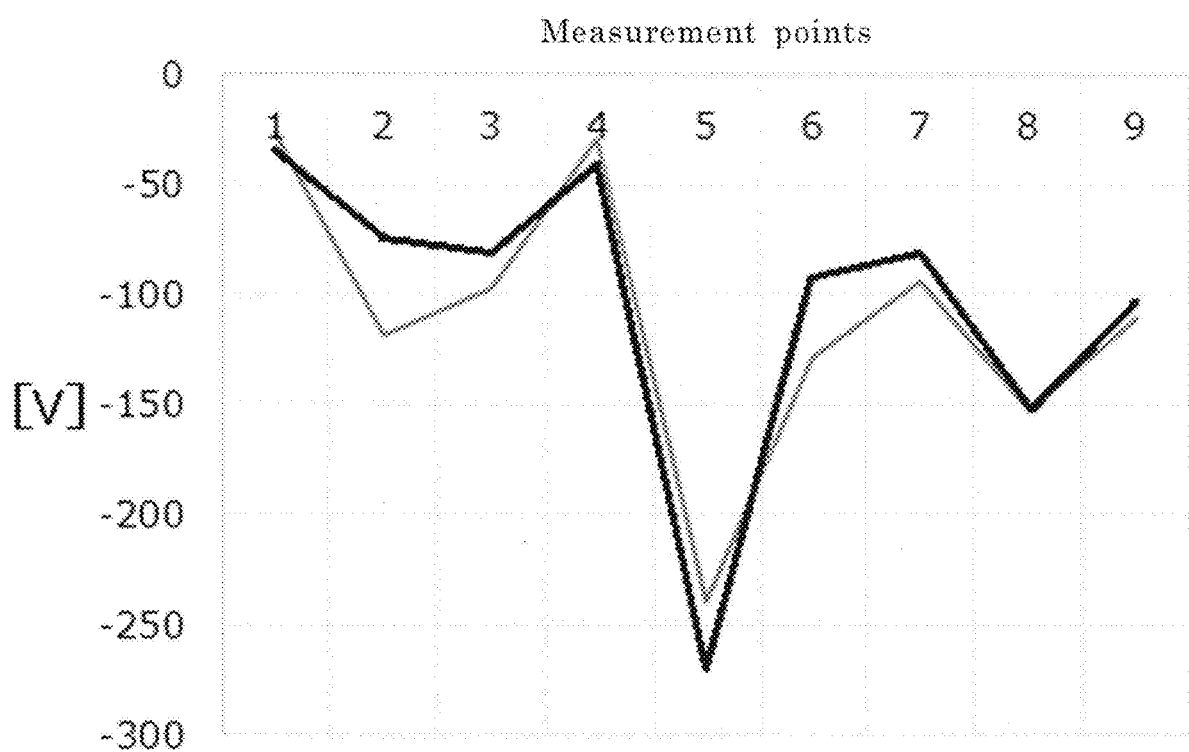
FIG. 8 is a graph showing a potential at each measurement point of a measurement sample (negatively charged sample) of a surface potential used for Examples of the present invention.

The results of measurement using the "sample B" (ceramic layer (−)) are shown in FIG. 8.

In the "sample B", only a negative (−) potential was exhibited at the measurement points 1 to 9 on both of the upper and lower surfaces (upper surface: thin line, lower surface: thick line).

From the results of FIG. 7 and FIG. 8, it was demonstrated that only positive (+) or negative (−) surface potential was obtained according to the present invention.

Comparative Example 1

"3M Filtrete" (air cleaning filter [for air conditioner]) was prepared as an electret filter for comparison.

Figure 9:
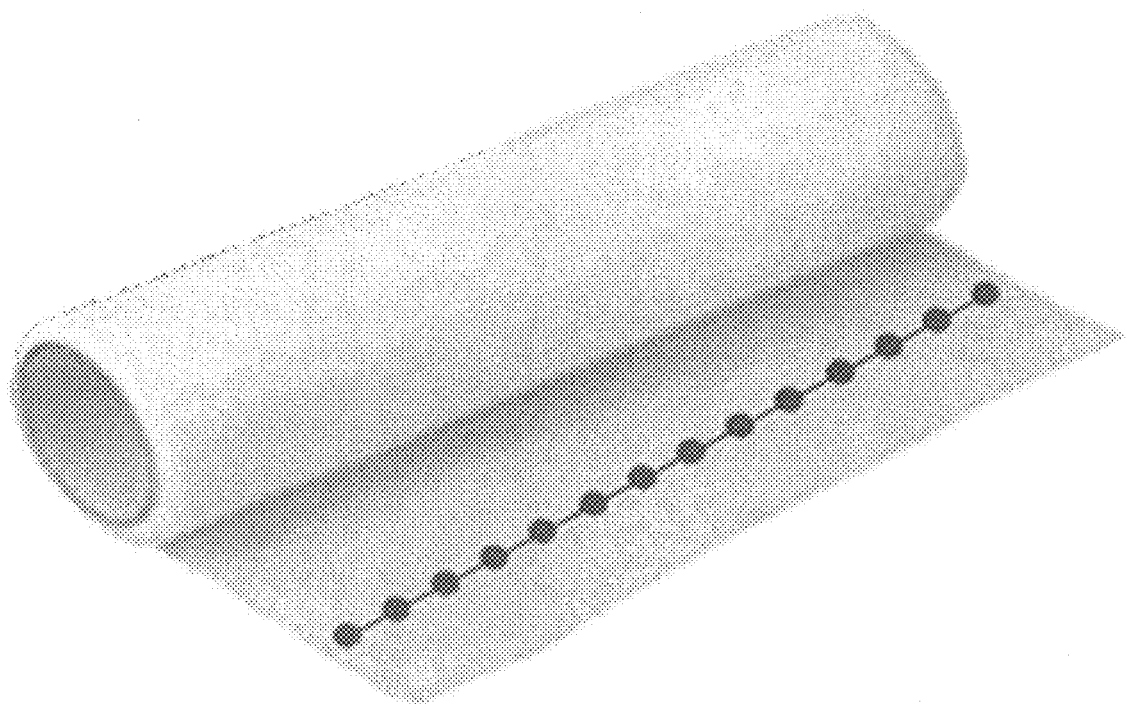
FIG. 9 is a photograph showing measurement points (14 places) of a conventional electret filter used for Comparative Examples.

As shown in FIG. 9, a potential was measured using an electrometer (manufactured by Kawaguchi Electric Works, Ltd., S2002A) at each of 14 places (1 cm interval) on the inner side of winding and 14 places (1 cm interval) (not shown) on the outer side of the winding (a distance from the surface: 3 mm). The results are shown in FIG. 10.

Figure 10:
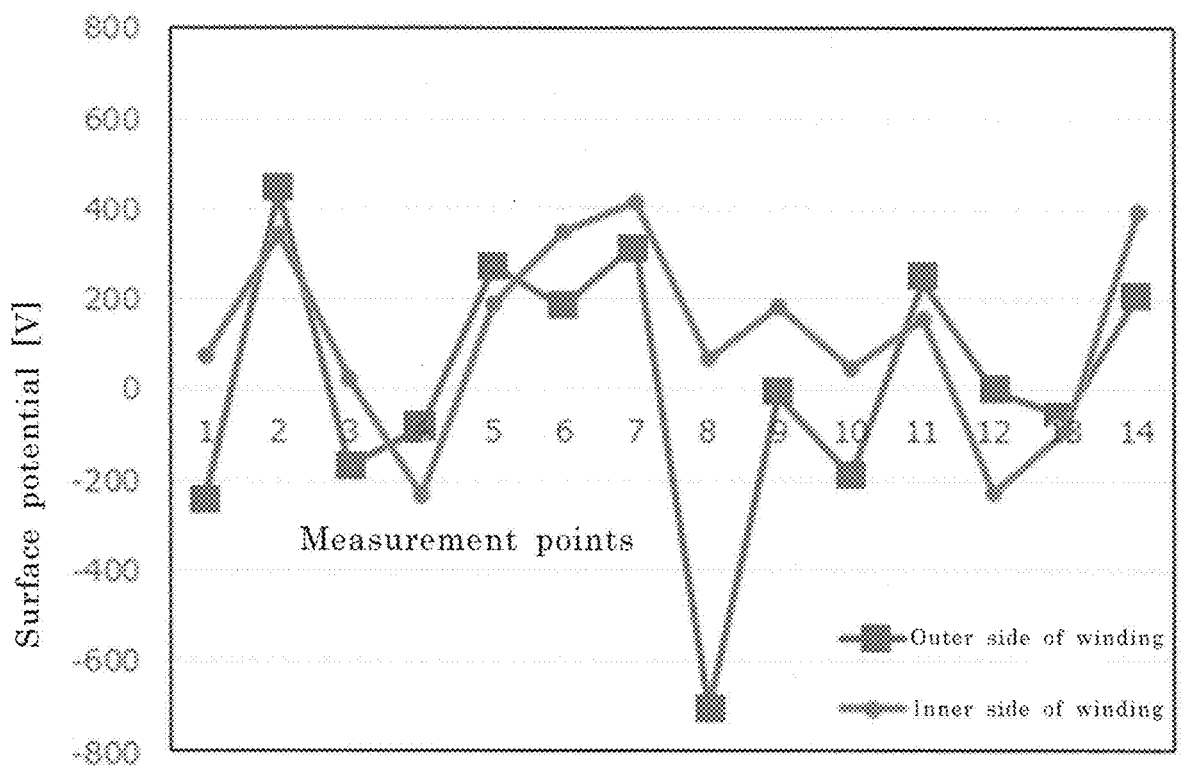
FIG. 10 is a graph showing a potential at each measurement point of a conventional electret filter used for Comparative Examples.

From the graph shown in FIG. 10, it was found that in the electret filter of Comparative Example 1, positive potentials and negative potentials are mixed on both of the outer side of the winding and the inner side of the winding.

From the comparison between Comparative Example 1 and Example 2, positive and negative potentials are mixed in Comparative Example 1, whereas only a positive (+) or negative (−) surface potential is exhibited in Example 2 of the present invention.

When there was only one of the positive or negative surface potential as in Example 1 and Example 2 of the present invention, the positive and negative charges did not cancel each other to be neutralized, thereby disappearing, so that the surface of the fiber (in particular, the surface of the electret filter) could be densely charged.

Example 3

Figure 11:
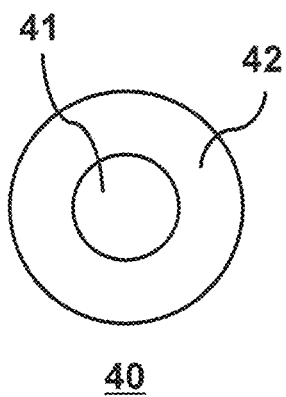
FIG. 11 is a schematic view schematically showing a composite fiber produced in Examples of the present invention.

In Example 3, a composite fiber (sample) 40 having a shape similar to the shape shown in FIGS. 1(A) to 1(C) was prepared using the following "paste for core portion" and "paste for sheath portion" (see FIG. 11).

<Preparation of Paste for Core Portion>

The paste for core portion contains a platinum (Pt) powder, a binder resin, and an organic solvent. A platinum (Pt) powder having an average particle size of 1.0 µm was used. As the binder resin, for example, a resin solution obtained by dissolving a resin in butyl carbitol is used. As the resin dissolved in butyl carbitol, for example, ethyl cellulose or cellulose acetate butyrate or the like is used.

In the preparation of the paste for core portion, 50 parts by weight of a platinum (Pt) powder (average particle diameter: 1.0 µm), a resin solution prepared by dissolving 10 parts by weight of ethyl cellulose in butyl carbitol, and butyl carbitol as the balance were mixed, and the paste for core portion was prepared by a ball mill.

<Preparation of Paste for Sheath Portion>

The paste for sheath portion contains a hydroxyapatite (HAp) powder, a polyvinyl butyral-based binder resin, and an organic solvent such as toluene. The hydroxyapatite having an average particle size of 300 nm was used.

In the preparation of the paste for sheath portion, 82 parts by weight of a hydroxyapatite (average particle diameter: 300 nm), 18 parts by weight of polyvinyl butyral, and toluene were mixed, and the paste for sheath portion was prepared by a ball mill.

<Preparation of Composite Fiber Precursor>

Using the paste for core portion and the paste for sheath portion, a "composite fiber precursor" having a circular cross section in which the paste for core portion and the paste for sheath portion were concentrically disposed through a double nozzle was prepared (center portion: paste for core portion, outer portion: paste for sheath portion, cross-sectional area ratio (metal (Pt)/ceramic (HAp)): 1/1).

<Calcination>

The "composite fiber precursor" was calcined under the following conditions to produce a composite fiber (sample) 40 in which a core portion 41 and a sheath portion 42 were adjacent to each other (see FIG. 11) (diameter of core portion 41: 0.1 mm, thickness of sheath portion 42: 0.1 mm).

(Calcination Conditions)

After a degreasing treatment under the conditions of 300° C. and 10 hours in air, calcination was performed under the conditions of a top temperature of 1400° C. and 2 hours in air.

<Electretization>

Figure 12:
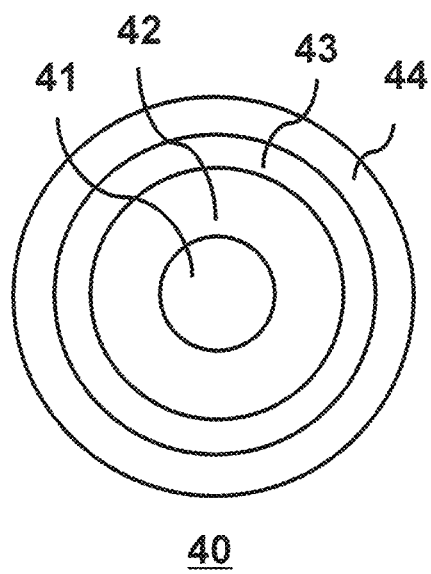
FIG. 12 is a schematic view schematically showing a charging method for a composite fiber produced in Examples of the present invention.

As shown in FIG. 12, a copper foil (copper tape) as a sheath portion electrode 44 of the composite fiber (sample) 40 and a silicone rubber film as an insulator 43 were disposed. A negative electrode was connected to the core portion (Pt) 41 of the composite fiber 40, and a positive electrode was connected to the sheath portion electrode 44. An electric field was applied to the composite fiber 40 under the following electric field application conditions to perform electretization. In the present Example, the sheath portion (HAp) 42 was positively (+) charged.

Electric Field Application Conditions

Temperature: 200° C.
Voltage: 2000 V
Application time: 1 hour

<Measurement of Surface Potential>

Figure 13:
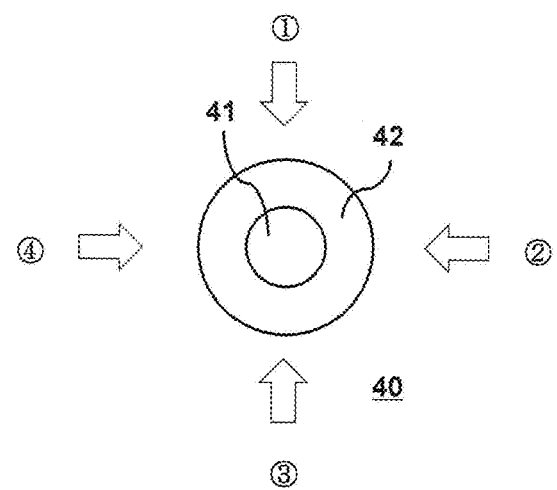
FIG. 13 is a schematic view schematically showing measurement points (4 places) of a composite fiber produced in Examples of the present invention.

After the insulator 43 and the sheath portion electrode 44 were removed from the composite fiber (sample) 40, the core portion 41 was connected to ground to measure the surface potential of the composite fiber 40. Specifically, a potential was measured using an electrometer (manufactured by Kawaguchi Electric Works, Ltd., S2002A) at four measurement points 1 to 4 (90° intervals) (up, down, left, and right) in the circumferential direction shown in FIG. 13 at an interval of 3 mm from the outer periphery of the composite fiber 40.

The measurement results of the surface potential measured using the composite fiber (sample) 40 are shown in the following Table 1.

In the composite fiber 40, only a positive (+) potential was exhibited in any of the upper, lower, left, and right directions at the measurement points 1 to 4.

TABLE 1

| | Surface potential [V] |
|---|---|
| Point 1 | 405 |
| Point 2 | 322 |
| Point 3 | 343 |
| Point 4 | 312 |

Comparative Example 2

In Comparative Example 2, a composite fiber for comparison having a shape similar to the shape shown in FIGS. 1(A) to 1(C) was produced using the following "metal wire for core portion" and "conventional electret filter".

<Metal Wire for Core Portion>

A copper wire (Cu) was prepared as a metal wire for core portion (diameter: 0.1 mm).

<Conventional Electret Filter>

"3M Filtrete" (air cleaning filter [for air conditioner]) was prepared as an electret filter.

An electret filter (3M Filtrete) was wound around and fixed to the copper wire (Cu) for core portion. A conventional electret filter wound with the outer side of winding on the upper side (surface) and a conventional electret filter wound with the inner side of winding on the upper side (surface) were prepared.

After the core portion (copper wire (Cu)) was connected to the ground (GND-connected), a surface potential was measured at 14 places (1 cm interval) along the axial direction of the fiber using an electrometer (manufactured by Kawaguchi Electric Works, Ltd., S2002A) (a distance from the surface: 3 mm).

As with the results shown in FIG. 10, it was found that positive potentials and negative potentials are mixed on both of the outer side and inner side of the winding of the electret filter.

From the comparison between Comparative Example 2 and Example 3, positive and negative potentials are mixed in Comparative Example 2, whereas only a positive (+) or negative (−) surface potential is exhibited in Example 3 of the present invention.

When there were only one of the positive or negative surface potential as in Example 3 of the present invention, the positive and negative charges did not cancel each other to be neutralized, thereby disappearing, so that the surface of the fiber (in particular, the surface of the electret filter) could be densely charged.

As described above, according to the present invention, the surface potential can be selected to be positive or negative, and the magnitude of the surface potential can be optionally controlled.

According to the present invention, the electrical characteristics of the fiber are improved, so that the amount of the fiber to be used can be reduced when used for the electret filter or the like, and thus the clogging (pressure loss) and the like of the filter can also be improved.

The composite fiber of the present disclosure can be used as an electret filter.

The composite fiber of the present disclosure can be processed into a yarn, and a cloth (for example, woven fabric, knitted fabric, and nonwoven fabric) and the like for use.

The composite fiber of the present disclosure can be used as a yarn, a cloth, or as a filter, particularly an electret filter.

What is claimed is:

1. A composite fiber comprising:
   a core portion comprising an electrically conductive material; and
   a sheath portion comprising at least one ceramic component selected from aluminum oxide, zirconium oxide, tricalcium phosphate, and apatite covering the core portion,
   wherein, when the core portion is connected to a ground, the composite fiber is constructed such that the sheath portion exhibits one of a positive surface potential or a negative surface potential over an entire surface of the sheath portion.

2. The composite fiber according to claim 1, wherein the electrically conductive material is a metal.

3. The composite fiber according to claim 1, wherein the composite fiber is an electret fiber.

4. The composite fiber according to claim 1, wherein the ceramic component is the apatite.

5. The composite fiber according to claim 1, wherein the sheath portion is composed of the apatite alone or a composite of the apatite and a resin.

6. The composite fiber according to claim 5, wherein the apatite is at least one selected from a group consisting of a fluoroapatite, a chloroapatite and a hydroxyapatite.

7. The composite fiber according to claim 4, wherein the apatite is at least one selected from a group consisting of a fluoroapatite, a chloroapatite and a hydroxyapatite.

8. The composite fiber according to claim 1, wherein the electrically conductive material is a composite of an electrically conductive filler and a resin.

9. The composite fiber according to claim 8, wherein the ceramic component is the apatite.

10. The composite fiber according to claim 8, wherein the sheath portion is composed of the apatite alone or a composite of the apatite and a resin.

11. The composite fiber according to claim 10, wherein the apatite is at least one selected from a group consisting of a fluoroapatite, a chloroapatite and a hydroxyapatite.

12. The composite fiber according to claim 9, wherein the apatite is at least one selected from a group consisting of a fluoroapatite, a chloroapatite and a hydroxyapatite.

13. The composite fiber according to claim 2, wherein the ceramic component is the apatite.

14. The composite fiber according to claim 2, wherein the sheath portion is composed of the apatite alone or a composite of the apatite and a resin.

15. The composite fiber according to claim 14, wherein the apatite is at least one selected from a group consisting of a fluoroapatite, a chloroapatite and a hydroxyapatite.

16. The composite fiber according to claim 13, wherein the apatite is at least one selected from a group consisting of a fluoroapatite, a chloroapatite and a hydroxyapatite.

17. The composite fiber according to claim 1, wherein both of the core portion and the sheath portion comprise a sintered body.

18. An electret filter comprising the composite fiber according to claim 1.

* * * * *